US010452320B2

(12) United States Patent
Schoenberger et al.

(10) Patent No.: US 10,452,320 B2
(45) Date of Patent: *Oct. 22, 2019

(54) ENCRYPTED DATA STORAGE AND RETRIEVAL SYSTEM

(71) Applicant: Secure Cloud Systems, Inc., Marco Island, FL (US)

(72) Inventors: David Schoenberger, Marco Island, FL (US); Timothy Reynolds, Marco Island, FL (US)

(73) Assignee: Secure Cloud Systems, Inc., Marco Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,352

(22) Filed: Aug. 6, 2018

(65) Prior Publication Data

US 2018/0373464 A1  Dec. 27, 2018

Related U.S. Application Data

(63) Continuation of application No. 14/644,815, filed on Mar. 11, 2015, now Pat. No. 10,042,589.

(51) Int. Cl.
*G06F 3/06* (2006.01)
*G06F 21/60* (2013.01)
(Continued)

(52) U.S. Cl.
CPC .......... *G06F 3/0683* (2013.01); *G06F 3/0623* (2013.01); *G06F 3/0647* (2013.01);
(Continued)

(58) Field of Classification Search
CPC ............... G06F 3/0683; G06F 21/6218; G06F 12/1408; G06F 3/0623
See application file for complete search history.

(56) References Cited

U.S. PATENT DOCUMENTS 5,748,740 A  5/1998 Curry et al.
5,889,860 A  3/1999 Eller et al.
(Continued)

FOREIGN PATENT DOCUMENTS

WO  2001/080141 A1  10/2001
WO  2006/094316 A2  9/2006

OTHER PUBLICATIONS http://securecloudsystems.com/our-solutions/your-challenge/.
(Continued)

*Primary Examiner* — Farid Homayounmehr
*Assistant Examiner* — Suman Debnath
(74) *Attorney, Agent, or Firm* — Akerman LLP

(57) ABSTRACT

According to one embodiment, a system includes one or more memory units and one or more processors. The processors are configured to receive a plurality of data elements. The processors are also configured to, for a first data element of the plurality of data elements, generate a first token for the first data element, and transmit the first token to a device. The processors are further configured to individually encrypt the first data element, and break the first encrypted data element into a plurality of encrypted data portions including a first encrypted data portion and a second encrypted data portion. The processors are further configured to transmit the first encrypted data portion of the first encrypted data element for storage in a first data storage device, and transmit the second encrypted data portion of the first encrypted data element for storage in a second data storage device.

20 Claims, 4 Drawing Sheets

(51) Int. Cl.
*G06F 21/62* (2013.01)
*G06F 21/00* (2013.01)
(52) U.S. Cl.
CPC ............ *G06F 21/00* (2013.01); *G06F 21/602* (2013.01); *G06F 21/6218* (2013.01)

(56) References Cited

U.S. PATENT DOCUMENTS

| | | | |
|---|---|---|---|
| 5,917,913 | A | 6/1999 | Wang |
| 6,105,013 | A | 8/2000 | Curry et al. |
| 7,171,693 | B2 | 1/2007 | Tucker et al. |
| 7,568,114 | B1 | 7/2009 | Schlafly |
| 7,970,669 | B1 | 6/2011 | Santos |
| 8,055,913 | B2 | 11/2011 | Ginter et al. |
| 8,639,947 | B2 | 1/2014 | Elovici et al. |
| 2002/0026321 | A1 | 2/2002 | Faris et al. |
| 2002/0112178 | A1 | 8/2002 | Scherr |
| 2005/0235163 | A1 | 10/2005 | Forlenza et al. |
| 2010/0280909 | A1 | 11/2010 | Zhang et al. |
| 2010/0306072 | A1 | 12/2010 | Ford, Jr. et al. |
| 2011/0047081 | A1 | 2/2011 | Kelly et al. |
| 2011/0083020 | A1 | 4/2011 | Michiels et al. |
| 2011/0161671 | A1 | 6/2011 | Whitehouse |
| 2012/0042162 | A1 | 2/2012 | Anglin et al. |
| 2013/0117561 | A1 | 5/2013 | Chawla et al. |
| 2013/0136258 | A1* | 5/2013 | Grube ............... H04L 9/14 380/44 |
| 2013/0218738 | A1 | 8/2013 | Senapati et al. |
| 2014/0115724 | A1* | 4/2014 | van Brandenburg ... G06F 21/10 726/30 |
| 2016/0267022 | A1 | 9/2016 | Schoenberger et al. |

OTHER PUBLICATIONS http://social.technet.microsoft.com/wiki/contents/articles/12956.biztalk-server-list-of-third-party-adapters.aspx.
http://docs.oracle.com/cd/E18727_01/doc.121/e13570/T172155T172160.htm.
https://web.archive.org/web/20121204005735/http:/www.transcertain.com/Services.html#CertainStore.
Alexandrov et al., "Superweb: Research Issues in Java-Based Global Computing", Department of Computer Science, University of California, 1996.
Ajmani et al., "A Trusted Third-Party Computation Service", MIT Laboratory for Computer Science, 2001.

* cited by examiner

ENCRYPTED DATA STORAGE AND RETRIEVAL SYSTEM

CROSS-REFERENCE TO RELATED APPLICATIONS

This application is a continuation application and claims the benefit of the filing date under 35 U.S.C. § 120 of U.S. patent application Ser. No. 14/644,815, filed Mar. 11, 2015, the entirety of which is incorporated herein by reference.

TECHNICAL FIELD

This disclosure relates generally to the field of data storage and more specifically to an encrypted data storage and retrieval system.

BACKGROUND

Traditionally, data (or a data element) may be stored in a local storage device (such as a computer owned by a business that created or received the data element) or in a networked storage device (such as servers that may be accessed over a communication network). These typical storage devices, however, may be susceptible to unauthorized access. For example, a person may hack into these typical storage devices, gaining access to the data. In order to prevent such unauthorized access, a storage device may traditionally be protected by security (such as a firewall or a password-based security system) or the entire storage device may be encrypted. Such traditional manners of protection, however, may be deficient as an unauthorized user may merely need to bypass the security (such as by guessing or stealing the password) or may merely need to gain access to a single encryption key to decrypt the entire storage device (or a large portion of the storage device).

SUMMARY

According to one embodiment, a system includes one or more memory units configured to store one or more instructions, and one or more processors coupled to the memory units. The processors are configured, upon executing the one or more instructions, to receive a plurality of data elements. The processors are also configured, for a first data element of the plurality of data elements, to generate a first token for the first data element, and transmit the first token to a device from which the first data element was received. The processors are further configured to individually encrypt the first data element, and break the first encrypted data element into a plurality of encrypted data portions of the first encrypted data element. The plurality of encrypted data portions of the first encrypted data element include a first encrypted data portion of the first encrypted data element and a second encrypted data portion of the first encrypted data element. The processors are further configured to transmit the first encrypted data portion of the first encrypted data element for storage in a first data storage device, and transmit the second encrypted data portion of the first encrypted data element for storage in a second data storage device.

Certain embodiments of the disclosure may provide one or more technical advantages. For example, the system of the disclosure may (1) encrypt a data element, (2) break the encrypted data element into encrypted data portions, and (3) store each encrypted data portion in a separate data storage device, thereby providing multiple levels of security for each data element. As such, in particular embodiments, even if an unauthorized entity (such as a hacker) was able to access a data storage device, the unauthorized entity would be unable to understand (or even decipher) any of the data elements because the unauthorized entity would not have access to all of the encrypted data portions (e.g., at least one other encrypted data portion may be stored in a different data storage device then is being accessed by the unauthorized entity), the encrypted data element would not be assembled (e.g., it would still be broken up into encrypted data portions), and the data element would also be encrypted. As such, the system of the disclosure may prevent data elements (such as, for example, important and valuable pieces of information) from being stolen (or otherwise accessed) by an unauthorized entity (such as a hacker). Therefore, in particular embodiments, the system may be more hack resistant than traditional data storage systems.

As another example, the system of the disclosure may individually encrypt each data element. Therefore, if 50,000 data elements are received, each of the 50,000 data elements may be encrypted individually, creating 50,000 encrypted data elements. In particular embodiments, the individual encryption of the data element may provide additional security to the data element and/or increase the speed of the system. For example, traditionally, an entire set of data elements (such as an entire database of data elements, an entire column of data elements, or an entire row of data elements) is encrypted together. In such an example, in order to access any one of the data elements, the entire set of data elements must be decrypted first. This, however, may be problematic because it may cause unrequested data elements to also be decrypted (which may open up the unrequested data elements to unauthorized hackers), and/or it may force the system to perform a large decryption of the entire set of data elements (as opposed to just decrypting the requested data element) which may require additional time. Contrary to these traditional techniques, the individual encryption (and individual decryption) of a data element may provide additional security because other data elements may not need to be decrypted in order to retrieve the requested data element. Furthermore, the individual encryption (and individual decryption) of a data element may increase the speed of the system because the system may only have to encrypt and/or decrypt a single data element (as opposed to an entire set of data elements). As such, the system may be more hack resistant than traditional data storage systems, and may also store and retrieve data elements faster than traditional data storage systems.

As a further example, the system of the disclosure may allow a device (such as a data user device) to transmit a token to a data management device in order to request that a data element uniquely identified (or otherwise represented by) the token be retrieved and transmitted to the device. In particular embodiments, this may allow the requesting device (such as a data user device) to only store the token for a particular data element. As such, in particular embodiments, the data user device may be able to access an entire data element (such as an entire spreadsheet), without having to use up much data storage space on the data user device.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Figure 1:
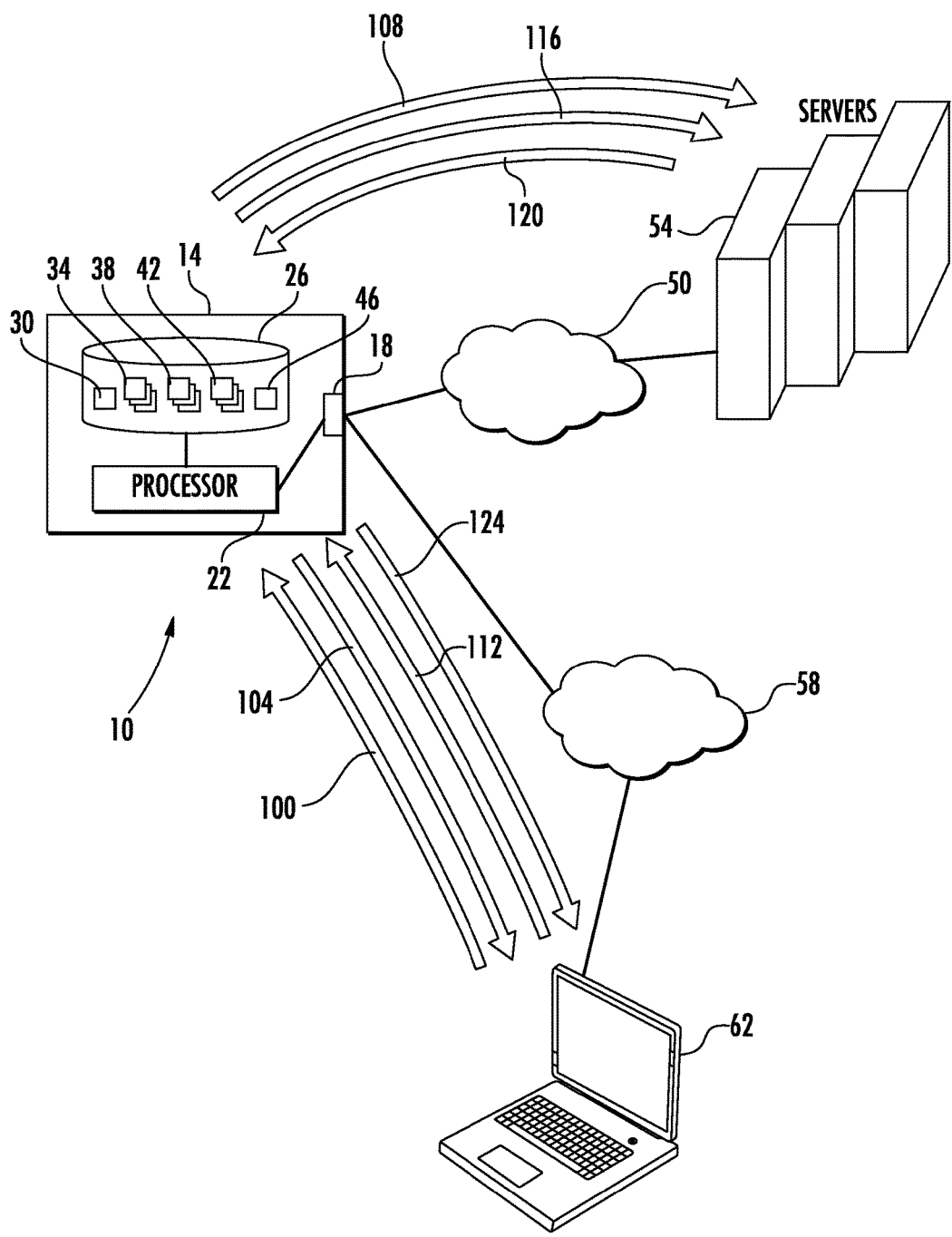
FIG. 1 illustrates an example system that allows data elements to be stored and/or retrieved.
Figure 2A:
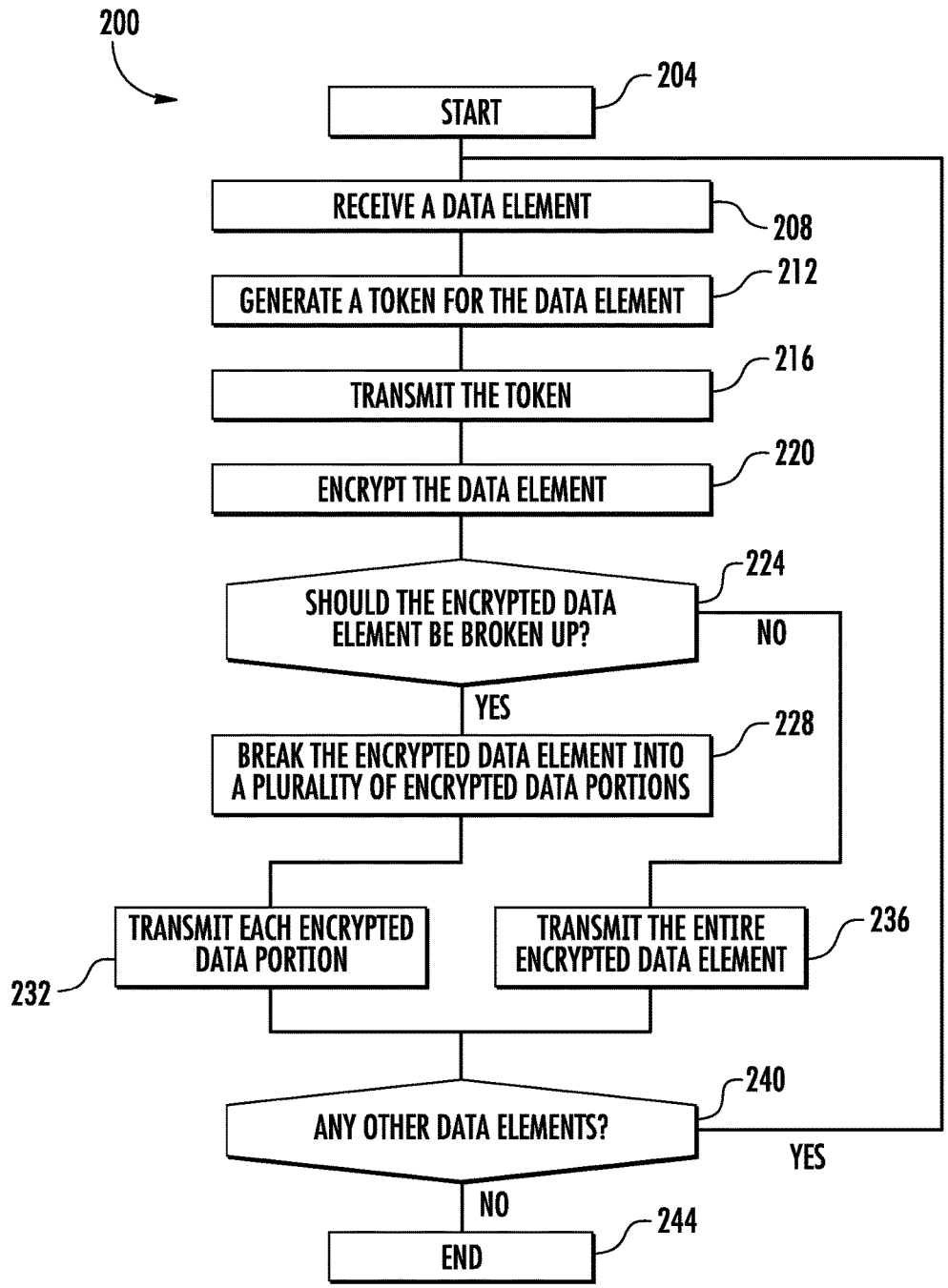
FIG. 2a illustrates an example method for storing data elements.
Figure 2B:
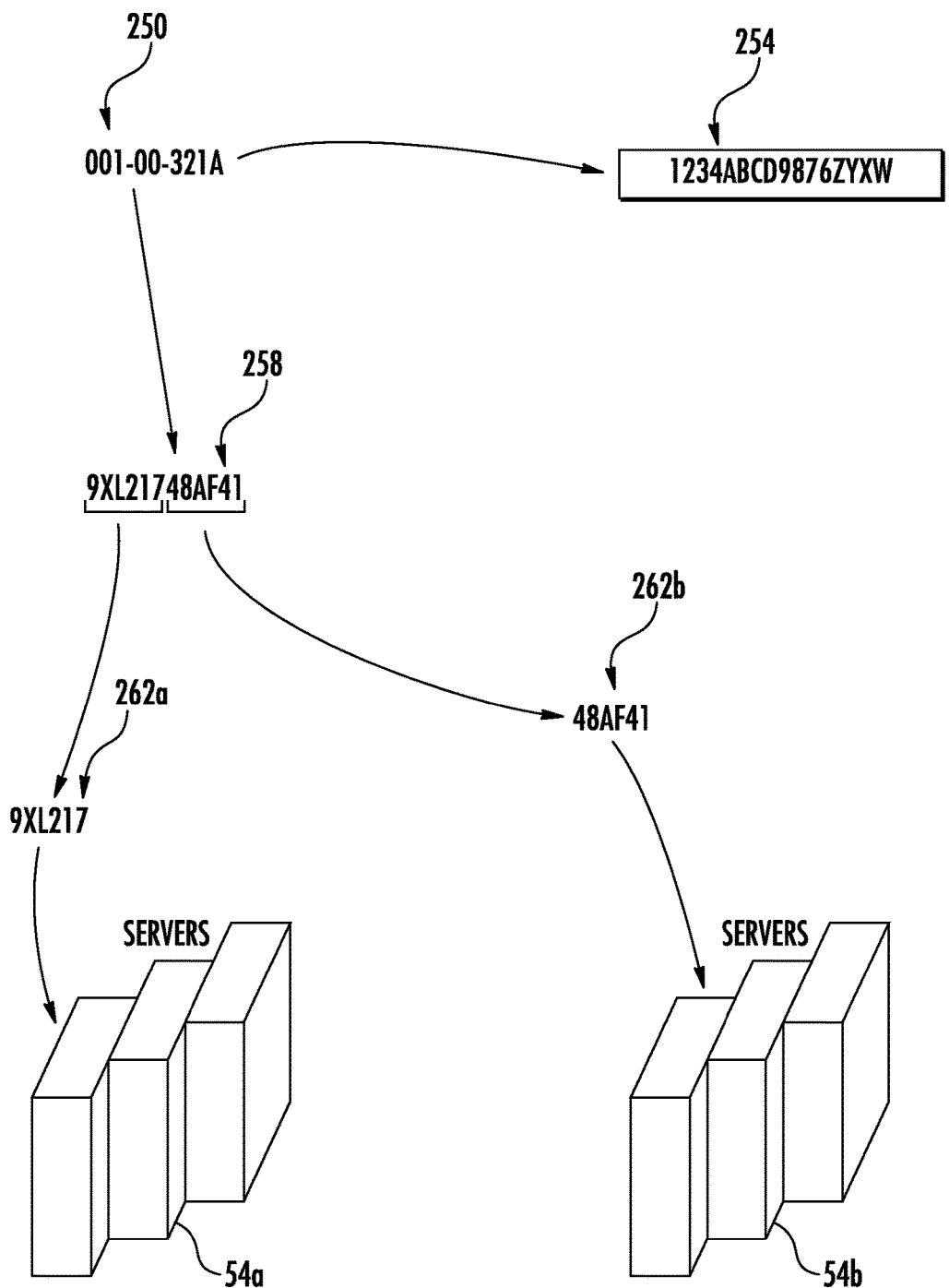
FIG. 2b illustrates an example of a data element, an encrypted data element, and encrypted data portions.
Figure 3:
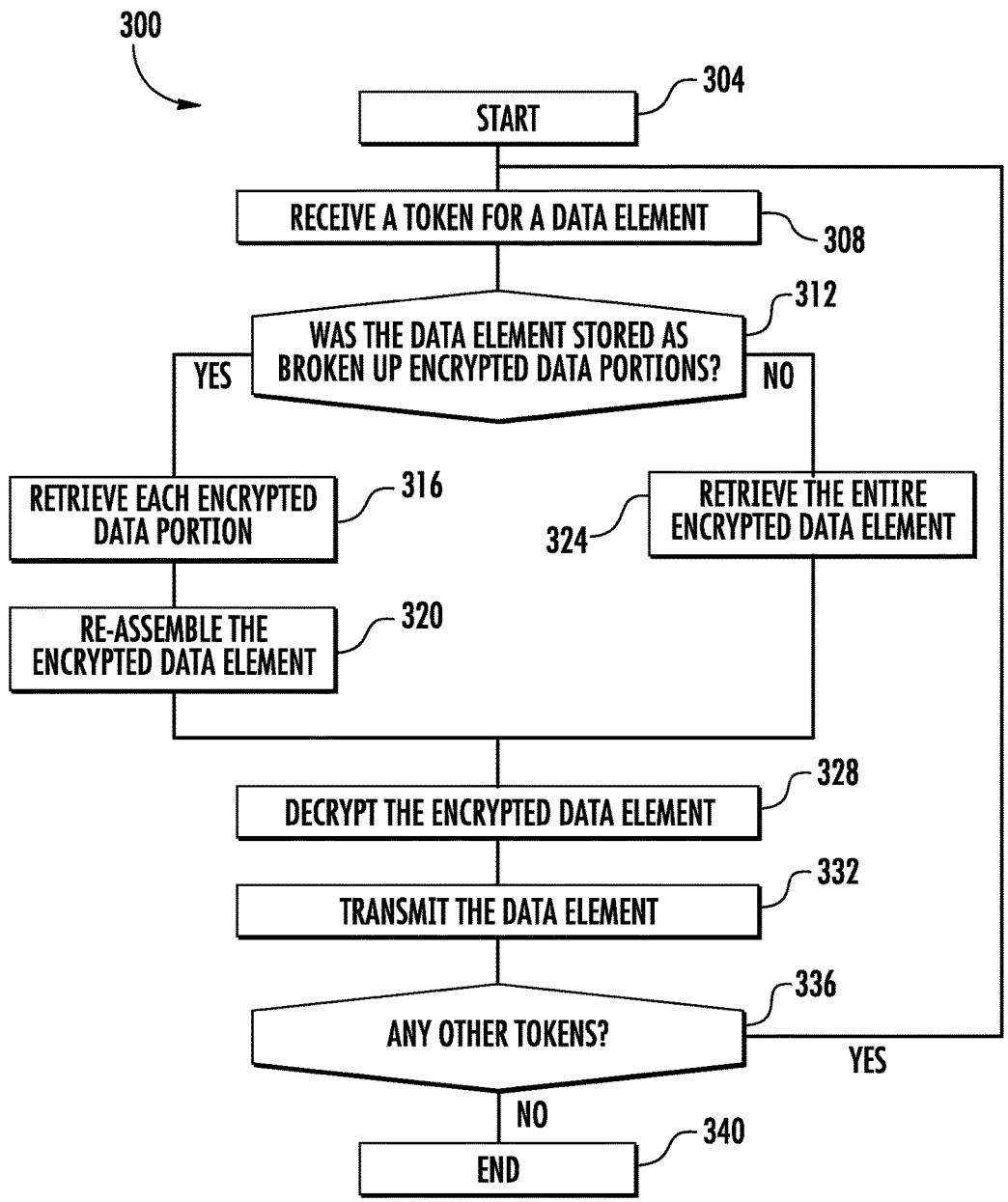
FIG. 3 illustrates an example method of retrieving a requested data element from storage.

Embodiments of the present disclosure are best understood by referring to FIGS. 1-3 of the drawings, like numerals being used for like and corresponding parts of the various drawings.

FIG. 1 illustrates an example system 10 that allows data elements to be stored and/or retrieved. System 10 includes a data management device 14 that receives a data element, individually encrypts the data element, breaks the encrypted data element into encrypted data portions, and transmits each encrypted data portion for storage in a separate data storage device 54. Additionally, data management device 14 may also generate a token for the data element, and transmit the token to the data user device 62 from which the data element was received. System 10 further includes data storage devices 54 that store the encrypted data portions, and further allow the encrypted data portions to be retrieved for re-assembly and decryption. In particular embodiments, by (1) encrypting a data element, (2) breaking the encrypted data element into encrypted data portions, and (3) storing each encrypted data portion in a separate data storage device 54, the system 10 may provide multiple levels of security for each data element.

A data element represents any type of information. For example, a data element may be personal information (e.g., a social security number, membership identifier, name, address), business information (e.g., a document, spreadsheet, or other information created, used, and/or received by a business), medical information (e.g., a medical report or diagnosis), financial information (e.g., information regarding investments, credit card information, bank information, account number), security information (e.g., a password, personal access number), any other type of information, or any combination of the preceding. A data element further represents any portion of information. For example, a data element may be an entire spreadsheet (or other document, such as a word document), or it may include a portion of an entire spreadsheet (or other document), such as only social security numbers or other personal information included in the spreadsheet (or other document). As another example, a data element may be an entire medical report, or it may include a portion of the medical report, such as only personal information included in the medical report and/or the diagnosis in the medical report.

Traditionally, data (or a data element) may be stored in a local storage device (such as a computer owned by a business that created or received the data element) or in a networked storage device (such as servers that may be accessed over a communication network). These typical storage devices, however, may be susceptible to unauthorized access. For example, a person may hack into these typical storage devices, gaining access to the data. In order to prevent such unauthorized access, a storage device may traditionally be protected by security (such as a firewall or a password-based security system) or the entire storage device may be encrypted. Such traditional manners of protection, however, may be deficient as an unauthorized user may merely need to bypass the security (such as by guessing or stealing the password) or may merely need to gain access to a single encryption key to decrypt the entire storage device (or a large portion of the storage device). As such, in particular embodiments, system 10 of FIG. 1 may provide various advantages. For example, system 10 may (1) encrypt a data element, (2) break the encrypted data element into encrypted data portions, and (3) store each encrypted data portion in a separate data storage device 54, thereby providing multiple levels of security for each data element. As such, in particular embodiments, even if an unauthorized entity (such as a hacker) was able to access a data storage device 54, the unauthorized entity would be unable to understand (or even decipher) any of the data elements because the unauthorized entity would not have access to all of the encrypted data portions (e.g., at least one other encrypted data portion may be stored in a different data storage device 54 than is being accessed by the unauthorized entity), the encrypted data element would not be assembled (e.g., it would still be broken up into encrypted data portions), and the data element would also be encrypted. As such, system 10 may prevent data elements (such as, for example, important and valuable pieces of information) from being stolen (or otherwise accessed) by an unauthorized entity (such as a hacker). Therefore, in particular embodiments, system 10 may be more hack resistant than traditional data storage systems.

As another example, system 10 may individually encrypt each data element. Therefore, if the data management device 14 receives 50,000 data elements, each of the 50,000 data elements may be encrypted individually, creating 50,000 encrypted data elements. In particular embodiments, the individual encryption of the data element may provide additional security to the data element and/or increase the speed of system 10. For example, traditionally, an entire set of data elements (such as an entire database of data elements, an entire column of data elements, or an entire row of data elements) is encrypted together. In such an example, in order to access any one of the data elements, the entire set of data elements must be decrypted first. This, however, may be problematic because it may cause unrequested data elements to also be decrypted (which may open up the unrequested data elements to unauthorized hackers), and/or it may force the system to perform a large decryption of the entire set of data elements (as opposed to just decrypting the requested data element) which may require additional time. Contrary to these traditional techniques, the individual encryption (and individual decryption) of a data element may provide additional security because other data elements may not need to be decrypted in order to retrieve the requested data element. Furthermore, the individual encryption (and individual decryption) of a data element may increase the speed of system 10 because system 10 may only have to encrypt and/or decrypt a single data element (as opposed to an entire set of data elements). As such, system 10 may be more hack resistant than traditional data storage systems, and may also store and retrieve data elements faster than traditional data storage systems.

As a further example, system 10 may allow a device (such as a data user device 62) to transmit a token to the data management device 14 in order to request that the data element uniquely identified (or otherwise represented by) the token be retrieved and transmitted to the device. In particular embodiments, this may allow the requesting device (such as a data user device 62) to only store the token for a particular data element. As such, in particular embodiments, the data user device 62 may be able to access an entire data element (such as an entire spreadsheet), without having to use up much data storage space on the data user device 62.

As illustrated, system 10 includes data management device 14. Data management device 14 represents any suitable components that receive data elements and manage the storage of the data elements. Data management device 14 may include a network server, any suitable remote server, a mainframe, a host computer, a workstation, a web server, a personal computer, a laptop, a mobile telephone (such as a Smartphone), an electronic notebook, a personal digital assistant, a file server, any other suitable device for receiving data elements and managing the storage of the data elements, or any combination of the preceding. Data management device 14 may manage the storage of a data element in any manner. As an example, the data management device 14 may encrypt a data element, break the encrypted data element into encrypted data portions, and transmit each encrypted data portion for storage. As another example, the data management device 14 may encrypt a data element and transmit the entire encrypted data element for storage (e.g., the encrypted data element may not be broken up for storage). Data management device 14 may also retrieve a data element that is being stored. For example, the data management device 14 may retrieve each encrypted data portion from storage, re-assemble the encrypted data element using the retrieved encrypted data portions, decrypt the encrypted data element, and then transmit the data element to another device, such as to data user device 62. As another example, the data management device 14 may retrieve the entire encrypted data element from storage, decrypt the encrypted data element, and then transmit the data element to another device, such as to data user device 62. Data management device 14 may also generate a token for each received data element, and transmit the token to the device from which the data element was received, such as the data user device 62. In particular embodiments, the token may allow the device (such as the data user device 62 or another device) to request retrieval of the stored data element.

The functions of data management device 14 may be performed by any suitable combination of one or more servers or other components at one or more locations. In an embodiment where the data management device 14 is a server, the server may be a private server, and the server may be a virtual or physical server. The server may include one or more servers at the same or remote locations. Also, data management device 14 may include any suitable component that functions as a server. As illustrated, data management device 14 includes a network interface 18, a processor 22, and a memory unit 26.

Network interface 18 represents any suitable device operable to receive information from network 50 (and/or network 58), transmit information through network 50 (and/or network 58), perform processing of information, communicate to other devices, or any combination of the preceding. For example, network interface 18 may receive data elements from data user device 62 over network 58. As another example, network interface 18 may communicate an encrypted data portion to data storage device 54 over network 50. Network interface 18 represents any port or connection, real or virtual, including any suitable hardware and/or software, including protocol conversion and data processing capabilities, to communicate through a local area network (LAN), a metropolitan area network (MAN), a wide area network (WAN), or other communication system that allows data management device 14 to exchange information with network 50, data storage device 54, network 58, data user device 62, or other components of system 10.

Processor 22 communicatively couples to network interface 18 and memory unit 26, and controls the operation and administration of data management device 14 by processing information received from network interface 18 and memory unit 26. Processor 22 includes any hardware and/or software that operates to control and process information. For example, processor 22 executes management application 30 to control the operation of data management device 14. Processor 22 may be a programmable logic device, a microcontroller, a microprocessor, any suitable processing device, or any combination of the preceding.

Memory unit 26 stores, either permanently or temporarily, data, operational software, or other information for processor 22. Memory unit 26 includes any one or a combination of volatile or non-volatile local or remote devices suitable for storing information. For example, memory unit 26 may include random access memory (RAM), read only memory (ROM), magnetic storage devices, optical storage devices, any other suitable information storage device, or any combination of the preceding. Additionally, memory unit 26 may be an encrypted data storage device (or a data storage device secured in any manner), providing protection against unauthorized attempts to access the information stored in memory unit 26. While illustrated as including particular information modules, memory unit 26 may include any suitable information for use in the operation of data management device 14.

As illustrated, memory unit 26 includes management application 30, encryption methods 34, encryption keys 38, token generation methods 42, and location database 46. Management application 30 represents any suitable set of instructions, logic, or code embodied in a computer-readable storage medium and operable to facilitate the operation of data management device 14. Encryption methods 34 represent any type of encryption method that may be utilized to encrypt a data element and/or decrypt an encrypted data element. For example, an encryption method 34 may be RSA, Data Encryption Standard (DES), triple DES (DES3), Advanced Encryption Standard (AES), Cryptographic hash functions, Message authentication codes (MACs), any other method of encryption, or any combination of the preceding. In particular embodiments, encryption methods 34 may further represent any type of method that may be used to generate one or more encryption keys 38, such as one or more data user keys, data keys, master keys, any other keys, or any combination of the preceding. In particular embodiments, one or more encryption keys 38 may be required in order to utilize one or more encryption methods 34 to encrypt a data element and/or decrypt an encrypted data element. Memory unit 26 may include any number of encryption methods 34. For example, memory unit 26 may include one encryption method 34, two encryption methods 34, three encryption methods 34, four encryption methods 34, five encryption methods 34, or any other number of encryption methods 34.

Encryption keys 38 represent any type of key that may be used with one or more encryption methods 34 to encrypt a data element and/or decrypt an encrypted data element. For example, encryption keys 38 may include one or more data user keys (discussed below with regard to FIG. 2a), data keys (discussed below with regard to FIG. 2a), master keys (discussed below with regard to FIG. 2a), any other key for an encryption method 34, or any combination of the preceding. Memory unit 26 may include any number of encryption keys 38. For example, memory unit 26 may include one or more data user keys for each user of system 10 (e.g., each business or user that stores data elements with the data management device 14 may have its own data user key(s)), one or more data keys for each data element stored by data management device 14 (e.g., a first social security number may have its own data key, a second social security number may also have its own data key, etc.), any number of master keys, and/or any number of any other encryption keys 38. In particular embodiments, although encryption keys 38 are illustrated as being stored in memory unit 26 of system 10, one or more of the encryption keys 38 may be stored in any other location accessible to the data management device 14. For example, the master keys may be stored in a separate memory unit from memory unit 26. As another example, the data keys may be stored in the location database 46.

Token generation methods 42 represent any method that may be used to generate one or more tokens for data elements. For example, token generation methods 42 may include a method of randomly generating a token, a method of generating a token using a data stamp, time stamp, and/or an identifier of a data management device 14, any other method, or any combination of the preceding. Further examples of token generation methods 42 are discussed below with regard to FIG. 2a. Memory unit 26 may include any number of token generation methods 42. For example, memory unit 26 may include one token generation method 42, two token generation methods 42, three token generation methods 42, four token generation methods 42, five token generation methods 42, or any other number of token generation methods 42.

Location database 46 represents a storage unit that stores, either permanently or temporarily, indicators of the locations of stored encrypted data elements (or of stored encrypted data portions). The location database 46 may be a database, a table, a graph, any other storage unit, or any combination of the preceding. In particular embodiments, in addition to storing indicators of the locations of stored encrypted data elements (or of stored encrypted data portions), location database 46 may store any other information. For example, for each data element that is stored by data management device 14, location database 46 may store a token for the data element, an indicator of the location of the encrypted data element (or of one of the encrypted data portions of the encrypted data element), a data key used to encrypt the data element and/or decrypt the encrypted data element, metadata (or other information) associated with the data element (such as the name of the data element, a time stamp for when the data element was received by the data management device 14, a time stamp for when the data element was last accessed, an identifier associated with the owner or user of the data element, an indication (or identifier) of a format type of the data element), any other information, or any combination of the preceding. In particular embodiments, the location database 46 may be utilized by the device management device 14 to retrieve a requested data element, as is discussed below with regard to FIG. 3.

Network 50 represents any suitable network operable to facilitate communication between the components of system 10, such as data management device 14 and data storage device 54. Network 50 may include any interconnecting system capable of transmitting audio, video, signals, data, messages, or any combination of the preceding. Network 50 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. In particular embodiments, network 50 may be a network that operates using Hypertext Transfer Protocol (HTTP) POST methods, HTTP GET methods, application programming interface (API) protocols, Extensible Markup Language (XML) formats, any other communication methods, communication protocols, or communication formats, or any combination of the preceding. Furthermore, in particular embodiments, one or more of the communications (such as all of the communications) between data management device 14 and data storage device 54 may be encrypted (or otherwise secured in any suitable manner), providing protection against unauthorized attempts to access the information included in the communications.

Data storage device 54 represents any suitable components that store all or a portion of one or more encrypted data elements. Data storage device 54 may include a network server, any suitable remote server, a mainframe, a host computer, a workstation, a web server, a personal computer, a file server, any other suitable device for storing data elements, or any combination of the preceding. The functions of data storage device 54 may be performed by any suitable combination of one or more servers or other components at one or more locations. In an embodiment where the data storage device 54 is a server, the server may be a private server, and the server may be a virtual or physical server. The server may include one or more servers at the same or remote locations. Also, data storage device 54 may include any suitable component that functions as a server. In particular embodiments, data storage device 54 may be (or may include) one or more databases for storing the data elements. Furthermore, a data storage device 54 may be (or may include) more than one database, such as two databases, three databases, five databases, or any other number of databases. System 10 may include any number of data storage devices 54. For example, system 10 may include one data storage device 54, two data storage devices 54, three data storage devices 54, five data storage devices 54, ten data storage devices 54, twenty data storage devices 54, or any other number of data storage devices 54.

Each encrypted data element stored by the data storage device 54 may be stored in any one of the data storage devices 54. For example, if system 10 includes three data storage devices 54, the encrypted data element may be stored in any of the three data storage devices 54. In particular embodiments, when an encrypted data element is broken up into encrypted data portions, each encrypted data portion (of that encrypted data element) may be stored in a different data storage device 54. For example, if system 10 includes three data storage devices 54 and an encrypted data element is broken up into three encrypted data portions, the first encrypted data portion may be stored in the first data storage device 54, the second encrypted data portion may be stored in the second data storage device 54, and the third encrypted data portion may be stored in the third data storage device 54. This may prevent an unauthorized entity from gaining access to all of the encrypted data portions of an encrypted data element if the unauthorized entity gains access to a single data storage device 54, in particular embodiments. Alternatively (or additionally), in particular embodiments, when a data storage device 54 includes two or more databases, encrypted data portions of the same encrypted data element may be stored in different databases of the same data storage device 54. This may prevent an unauthorized entity from gaining access to all of the encrypted data portions of an encrypted data element if the unauthorized entity gains access to a single database of a data storage device 54, in particular embodiments. Alternatively (or additionally), when an encrypted data element is broken up into encrypted data portions, each encrypted data portion (of that encrypted data element) may be stored in different unrelated locations of the same data storage device 54, in particular embodiments. For example, if an encrypted data element is broken into three encrypted data portions, the first encrypted data portion may be stored in a first location in the first data storage device 54 (e.g., the location at Column 1, Row 1 of a database), the second encrypted data portion may be stored in a second unrelated location in the first data storage device 54 (e.g., the location at Column 10, Row 15 of the database), and the third encrypted data portion may be stored in a third unrelated location in the first data storage device 54 (e.g., the location at Column 89, Row 115 of the database). In such an example, if an unauthorized entity gains access to the first data storage device 54, each of the encrypted data portions of an encrypted data element may be stored in unrelated locations in the first data storage device, which may prevent the unauthorized entity from deciphering the entire encrypted data element.

Network 58 represents any suitable network operable to facilitate communication between the components of system 10, such as data management device 14 and data user device 62. Network 58 may include any interconnecting system capable of transmitting audio, video, signals, data, messages, or any combination of the preceding. Network 58 may include all or a portion of a PSTN, a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the components. In particular embodiments, network 58 may be a network that operates using Hypertext Transfer Protocol (HTTP) POST methods, HTTP GET methods, application programming interface (API) protocols, Extensible Markup Language (XML) formats, any other communication methods, communication protocols, or communication formats, or any combination of the preceding. Furthermore, in particular embodiments, one or more of the communications (such as all of the communications) between data management device 14 and data user device 62 may be encrypted (or otherwise secured in any suitable manner), providing protection against unauthorized attempts to access the information included in the communications. Additionally, although network 58 and network 50 are illustrated as separate networks, network 58 and network 50 may be the same network. In such an example, a single network may communicate data to and/or from data user device 62, and may also communicate encrypted data elements (or encrypted data portions) to and/or from data storage device 54.

Data user device 62 represents any suitable components that allow data elements to be transmitted to data management device 14. For example, data user device 62 may include a personal computer, a workstation, a laptop, a mobile telephone (such as a Smartphone, or any other wireless, cellular, cordless, or satellite telephone), an electronic notebook, a personal digital assistant, a data entry kiosk, a scanner, any other device (wireless, wireline, or otherwise) that allows data elements to be transmitted to data management device 14, or any combination of the preceding. Data user device 62 may be associated with a business. For example, a business (such as a merchant of goods, or a doctor's office) may have information (e.g., personal information about customers, important information about the business or its customers, trade secret information, or any other information) that the business would like securely stored in a location separate from the data user device 62. Data user device 62 may also (or alternatively) be associated with a person. For example, a person may have information (e.g., important documents, photographs, passwords, or any other information) that the person would like securely stored in a location separate from the data user device 62. In particular embodiments, this information may be data elements that are transmitted to data management device 14.

In addition to transmitting data elements to data management device 14, data user device 62 may further allow the stored data elements to be retrieved from the data management device 14. For example, when a business wants to access a person's social security number or bank account number that was transmitted to the data management device 14 for secure storage, the data user device 62 may retrieve the person's social security number or bank account number for viewing by the business (or for use by the business). In particular embodiments, data user device 62 may retrieve the data element by sending a request (with a token) to data management device 14, which may retrieve the encrypted data portions, re-assemble the encrypted data element using the encrypted data portions, decrypt the encrypted data element, and transmit the data element to the data user device 62.

In an exemplary embodiment of operation, a first user of system 10 (such as a business) may desire to have some of its information securely stored in a location separate from the business, such as stored by data management device 14. For example, the business may have the social security numbers of 50,000 of its customers, and may desire to have those 50,000 social security numbers stored by data management device 14, instead of storing the social security numbers on the business' systems. In order to do so, the business may use the data user device 62 to transmit the 50,000 social security numbers to the data management device 14 (via one or more data transmissions 100). The 50,000 social security numbers may be transmitted to the data management device 14 as 50,000 data elements (e.g., one data element for each social security number), as a single data element (e.g., one data element for all of the social security numbers), or as any other number of data elements. Furthermore, the 50,000 data elements may be transmitted to the data management device 14 via 50,000 different data transmissions 100, a single data transmission 100, or any other number of data transmissions 100.

The data management device 14 may receive the data element(s) from the data user device 62. Following the receipt of the data element(s), data management device 14 may generate a token for each data element, and may transmit the token(s) back to the data user device 62 (via token transmission 104). All of the tokens may be transmitted back to the data user device 62 as different token transmissions 104 (e.g., 50,000 token transmissions 104 for 50,000 tokens), as the same token transmission 104 (e.g., a single token transmission 104 for 50,000 tokens), or any other number of token transmissions 104. The token for a data element may be stored by the data user device 62, and may allow the data user device 62 to request that particular data element back from the data management device 14. An example of the generation of a token, and the transmission of the token to the data user device 62 is discussed below with regard to FIG. 2a.

Additionally, following receipt of the data element(s), data management device 14 may individually encrypt each data element. For example, if the data management device 14 received 50,000 data elements (e.g., one data element for each social security number), each of the 50,000 data elements may be encrypted individually, creating 50,000 encrypted data elements. Each encrypted data element may then be broken up into encrypted data portions. The encrypted data element may be broken up into any number of encrypted data portions, and each encrypted data portion may include any amount (or portion) of the encrypted data element. Each encrypted data portion (of an encrypted data element) may be transmitted to data storage device(s) 54 for storage (via storage transmission 108). The encrypted data portions (of an encrypted data element) may each be transmitted to a different data storage device 54. For example, if an encrypted data element is broken up into three encrypted data portions, the first encrypted data portion may be transmitted for storage in a first data storage device 54, the second encrypted data portion may be transmitted for storage in a second data storage device 54, and the third encrypted data portion may be transmitted for storage in a third data storage device 54. An example of the encrypting of a data element, the breaking up of the encrypted data element into encrypted data portions, and the transmission of the encrypted data portions for storage is discussed below with regard to FIG. 2*a*. Alternatively, instead of breaking up an encrypted data element, the entire encrypted data element may be transmitted to data storage device 54 for storage (via storage transmission 108). An example of the transmission of an entire encrypted data element for storage is discussed below with regard to FIG. 2*a*.

Following the storage of the data elements by data management device 14, the business (or a different user, such as a user that has been given temporary access rights to a data element) may desire to access one of the stored data elements. For example, the business may need a customer's social security number to conduct a transaction. In order to access the stored data element, the business may utilize the data user device 62 to transmit the token for that particular data element to the data management device 14 (via data element request 112). Based on the received token, the data management device 14 may retrieve each of the encrypted data portions (of the data element) from storage (via retrieval request 116 and retrieval transmission 120) and re-assemble the encrypted data element using the encrypted data portions (or the data management device 14 may retrieve the entire encrypted data element from storage, if it was stored in its entirety). The data management device 14 may then decrypt the encrypted data element, and transmit the data element to the data user device 62 (via data response 124). An example of receiving a token for a data element, retrieving each of the encrypted data portions (of the data element) from storage, re-assembling the encrypted data element using the encrypted data portions, decrypting the encrypted data element, and transmitting the data element to the data user device 62 is discussed below with regard to FIG. 3. Additionally, an example of receiving a token for a data element, retrieving an entire encrypted data element, decrypting the encrypted data element, and transmitting the data element to the data user device 62 is also discussed below with regard to FIG. 3. The business may then view (or otherwise access) the customer's social security number to conduct the transaction, for example.

Modifications, additions, or omissions may be made to system 10 without departing from the scope of the invention. For example, data management device 14 may receive and store any number of data elements, such as one data element, two data elements, three data elements, five data elements, 100 data elements, 1,000 data elements, 50,000 data elements, one million data elements, ten million data elements, 50 million data elements, or any other number of data elements. As a further example, system 10 may utilize any number of data transmissions 100, token transmissions 104, storage transmissions 108, data element requests 112, retrieval requests 116, retrieval transmissions 120, and/or data responses 124, and the data transmissions 100, token transmissions 104, storage transmissions 108, data element requests 112, retrieval requests 116, retrieval transmissions 120, and/or data responses 124 may be performed in parallel with other steps, or in any suitable order. As another example, system 10 may include any number of data management devices 14, networks 50, data storage devices 54, networks 58, and/or data user devices 62 (and/or any number of components, such as processors or memory units illustrated in the above described devices). Also, any suitable logic may perform the functions of system 10 and the components and/or devices within system 10. As a further example, system 10 may include additional devices, such as additional devices that may access a data element following its retrieval from storage. In such an example, a data user device 62 may transmit a data element (such as a social security number) for storage, but may request that the other device (such as a third party device) receive the token for the data element, or that the other device be able to access (permanently or temporarily) the data element after it is retrieved at the request of the data user device 62 or the other device.

Furthermore, one or more components of system 10 may be separated, combined, and/or eliminated. For example, although data management device 14 and data storage device 54 are illustrated as being separate devices, data management device 14 and data storage device 54 may be the same device. In such an example, the single device may encrypt the data element, break the encrypted data element into encrypted data portions, store one or more of the encrypted data portions, retrieve the encrypted data portions, re-assemble the encrypted data element, decrypt the data element, and transmit the data element to the data user device 62. As another example, although the data management device 14 is illustrated as being a single device, the data management device 14 may be one or more devices. In such an example, one or more of the functions of the data management device 14 may be performed by separate devices (e.g., a first data management device 14 may encrypt the data element, a second data management device 14 may break the encrypted data element into encrypted data portions, etc.)

FIG. 2*a* illustrates an example method for storing data elements. In particular embodiments, one or more steps of method 200 may be performed by data management device 14 of FIG. 1. Furthermore, one or more steps of method 200 may be (or may be performed in response to) one or more of data transmissions 100, token transmissions 104, and/or storage transmissions 108 of FIG. 1.

The method 200 begins at step 204. At step 208, a data element is received. The data element may represent any type of information, as is discussed above. For example, the data element may be personal information (e.g., a social security number, membership identifier, name, address), business information (e.g., a document, spreadsheet, or other information created, used, and/or received by a business), medical information (e.g., a medical report or diagnosis), financial information (e.g., information regarding investments, credit card information, bank information, account number), security information (e.g., a password, personal access number), any other type of information, or any combination of the preceding. The data element may further represent any portion of information. For example, the data element may be an entire spreadsheet (or other document, such as a word document), or it may include a portion of an entire spreadsheet (or other document), such as only social security numbers or other personal information included in the spreadsheet (or other document). As another example, the data element may be an entire medical report, or it may include a portion of the medical report, such as only personal information included in the medical report and/or the diagnosis in the medical report. An example of the data element as a social security number is illustrated in FIG. 2b as data element 250.

The data element may be received in any manner. For example, the data element may be transmitted to the data management device 14 by one or more data user devices 62 of FIG. 1, such as via one or more of data transmissions 100. Additionally, the data element may be received for any reason. For example, the data element may be received as a result of the user of a data user device 62 (such as an employee at a business) of FIG. 1 desiring to transmit the data element for secure storage by the data management device 14.

At step 212, a token is generated for the data element. A token may be a unique identifier for the data element. For example, the token may be a unique identifier that is generated for only a single data element, regardless of the size of the single data element (e.g., the data element may be a single character or it may be an entire spreadsheet). In such an example, if a first data element (e.g., a social security number for John Doe) is received, and a second data element (e.g., a word document) is received, each data element will have a different token that uniquely identifies that particular data element. In particular embodiments, as a unique identifier of the data element, the token may be used to retrieve a stored data element. For example, as is discussed below, a device may transmit the token to the data management device 14 in order to request that the data element uniquely identified (or otherwise represented) by the token be retrieved and transmitted to the device. In particular embodiments, this may allow the requesting device (such as a data user device 62) to only store the token for a particular data element. As such, the data user device 62 may be able to access an entire data element (such as an entire spreadsheet), without having to use up much data storage space on the data user device 62. Although the token may be a unique identifier for a particular data element, in particular embodiments, the token may not include any identifying information for the data element and/or an identifier of the location at which the data element may be stored. As such, even if an unauthorized user was able to gain access (or steal) a token, the unauthorized user would be unable to decode the token to determine the data element and/or the location at which the data element may be stored.

The token may be any unique identifier for a data element. For example, the token may be a set of numbers, a set of letters (e.g., A, B, C, etc.), a set of numbers and letters, a set of symbols (e.g., %, !, ?, etc.), a code, any other grouping of characters, or any combination of the preceding. The token may have any length. For example, the parent identifier may be an eight character identifier, a sixteen character identifier, a 32 character identifier, an identifier with a length between eight characters and 32 characters, or an identifier with any other length. An example of a token is illustrated in FIG. 2b as token 254.

The token may be generated in any manner. In particular embodiment, the token may be generated using one or more token generation methods 42 of FIG. 1. As an example, the token may be a random unique identifier that is generated randomly in response to receiving the data element. As another example, the token may be generated using a date stamp for when the data element was received by the data management device 14, a time stamp for when the data element was received by the data management device 14, and/or an identifier of the data management device 14 that received the data element. One example of the generation of a token may include one or more of the following steps: (1) obtain a current timestamp for the receipt of the data element and convert the timestamp to a string; (2) incorporate a tie-breaker made up of the right most six characters of the primary key of the data element and convert to a string; (3) concatenate these strings into a new string and convert to a 64 bit integer; (4) convert to a base 32 representation, except use a "digit mapper" rather than the standard base 32 digit mapper; (5) reverse the resulting string; (6) prepend the string with a base 32 representation of the current year; and (7) pad the resulting string to 16 characters by prepending the appropriate number of zeroes.

At step 216, the token is transmitted. The token may be transmitted to the device from which the data element was received. For example, if the data element was received from a business, the token may be transmitted to the business. As such, the business may store the token, and may transmit it back to the data management device 14 when the business desires to request the data element. The token may also (or alternatively) be transmitted to any other device. For example, the data element may be received from the data user device 62 associated with the business, but the token may also (or alternatively) be transmitted to a third party (such as another business or user). This may allow the third party to also (or alternatively) request the data element from the data management device 14. Following transmission of the token to a device, the receiving device may store the token in any manner. For example, the device (such as data user device 62) may have a file associated with a customer, and the data element may be a social security number of that customer. In such an example, the file stored by the data user device 62 may store the token for the customer's social security number (as opposed to storing the social security number, itself) as, for example, a link or data file. As such, when the business desires to view (or use) the customer's social security number, an employee of the business may click on the token (or activate the token in any other manner, such as uploading the token), causing the token to be transmitted to the data management device 14 to request the social security number.

At step 220, the data element is encrypted. The data element may be encrypted in any manner. In particular embodiments, the data element may be encrypted using one or more encryption methods 34. For example, the data element may be encrypted using any suitable encryption method 34, which may include for example RSA, DES, DES3, AES, Cryptographic hash functions, MACs, any other method of encryption, or any combination thereof. The encrypted data element may have any form. For example, the encrypted data element may be a set of numbers, a set of letters (e.g., A, B, C, etc.), a set of numbers and letters, a set of symbols (e.g., %, !, ?, etc.), a code, any other grouping of characters, or any combination of the preceding. The encrypted data element may have any length and/or size. An example of an encrypted data element is illustrated in FIG. 2b as encrypted data element 258.

In particular embodiments, the data element may be encrypted individually (e.g., each received data element may be individually encrypted). In such embodiments, if the data management device 14 receives 50,000 data elements, each of the 50,000 data elements may be encrypted individually, creating 50,000 encrypted data elements. In particular embodiments, the individual encryption of the data element may provide additional security to the data element and/or increase the speed of system 10. For example, traditionally, an entire set of data elements (such as an entire database of data elements, an entire column of data elements, or an entire row of data elements) is encrypted together. In such an example, in order to access any one of the data elements, the entire set of data elements must be decrypted first. This, however, may be problematic because it may cause unrequested data elements to also be decrypted (which may open up the unrequested data elements to unauthorized hackers), and/or it may force the system to perform a large decryption of the entire set of data elements (as opposed to just decrypting the requested data element) which may require additional time. Contrary to these traditional techniques, the individual encryption (and individual decryption) of a data element may provide additional security because other data elements may not need to be decrypted in order to retrieve the requested data element. Furthermore, the individual encryption (and individual decryption) of a data element may increase the speed of system 10 because system 10 may only have to encrypt and/or decrypt a single data element (as opposed to an entire set of data elements).

In particular embodiments, the data element may be encrypted using one or more encryption keys 38 that may be used with one or more encryption methods 34 of FIG. 1. For example, the data element may be encrypted using, for example, a data user key, a data key, any other key, or any combination of the preceding. A data user key may be a key that is unique to a user (such as a business) of a particular data user device 62 (or a group of data user devices 62). For example, a first business that stores data elements with the data management device 14 may have a first data user key, and a second business (or user) that stores data elements with the data management device 14 may have a second data user key that is different from the first data user key. The data user key may be generated when the user of the data user device 62 registers with the data management device 14. The data user key may be generated in any manner. For example, the data user key may be a randomly generated key, may be generated using one or more encryption methods 34, may be generated using any of the other generation methods discussed herein, or may be generated in any other manner. The data user key may be stored by the data management device (such as stored in memory 26 as encryption keys 38 of FIG. 1), and retrieved by the data management device 14 when the user of the data user device 62 has been authenticated by the data management device 14 and is communicating with the data management device 14 (such as when the user of the data user device 62 enters a password to log into an account with the data management device 14, and then begins transmitting data elements for storage).

A data key may be a key that is unique to each received data element. For example, a first data element (e.g., a social security number for John Doe) may have a first data key, and a second data element (e.g., a word document) may have a second data key that is different from the first data key. The data key may be generated when the data element associated with the data key is received by the data management device 14. The data key may be generated in any manner. For example, the data key may be a randomly generated key, may be generated using one or more encryption methods 34, may be generated using any of the other generation methods discussed herein, or may be generated in any other manner. After being generated and used to encrypt the data element, the data key may be stored by the data management device (such as stored in memory 26 as encryption keys 38 of FIG. 1, or stored in location database 46 of FIG. 1), and retrieved by the data management device 14 when decrypting the encrypted data element.

In addition to the data element being encrypted using encryption keys 38 (such as a data user key, a data key, and/or any other key), the encryption keys 38 used to encrypt the data element may also be encrypted. For example, the data management device 14 may utilize one or master keys that may be used to encrypt and/or decrypt the encryption keys 38. As such, before an encryption key 38 (such as a data user key or a data key) can be utilized to encrypt and/or decrypt a data element, the encryption key 38 may first be decrypted using the one or master keys (such as by, for example, performing a MD5 one-way hash of the master keys). In particular embodiments, this may provide additional security to the stored data elements. For example, even if an unauthorized user was able to gain access to the encryption keys 38 (such as the data user keys and/or the data keys) used to encrypt and/or decrypt a data element, the unauthorized user would be unable to decipher the encryption keys 38, because they are also encrypted. Furthermore, in particular embodiments, if the security of the master keys were ever compromised (or if a particular amount of time has passed, or if an administrator or other user of system 10 desires to change the master keys), all of the encryption keys 38 may be re-encrypted using newly generated master keys, providing even additional security. The master keys may be generated in any manner. For example, the master keys may be a randomly generated key, may be generated using one or more encryption methods 34, may be generated using any of the other generation methods discussed herein, or may be generated in any other manner.

After the data element is encrypted (at step 220), the method 200 may move to step 224, where it is determined whether the encrypted data element should be broken up. Whether the encrypted data element should be broken up may be determined in any manner. As an example, it may be determined that the encrypted data element should be broken up when the encrypted data element is over a size threshold, such as, for example, 128 megabytes, 256 megabytes, 512 megabytes, 1 gigabyte, or any other size. As a further example, it may be determined that the encrypted data element should be broken up when the encrypted data element is over a length threshold, such as, for example, ten characters, 50 characters, 100 characters, 1,000 characters, or any other length. As another example, it may be determined that the encrypted data element should be broken up when the data user device 62 has requested that the encrypted data element be broken up. In such an example, the data user device 62 may request that the encrypted data element be broken up if the user of the data user device 62 desires that the data element be stored under further security than just encryption. The data user device 62 may make such a request in any manner, such as by selecting a particular option when transmitting the data element to the data management device 14. As a further example, it may be determined that the encrypted data element should be broken up when the data element has a particular format type, such as a file, a document, a spreadsheet, a pdf, or any other format type. As another example, it may be determined that the encrypted data element should be broken up when the data element does not have a particular format type, such as a text item, or any other format type. The encrypted data element may be determined to have a particular format type (or not have a particular format type) based on an analysis of the data element by data management device 14 and/or based on a selection made by the user of the data user device 62 (e.g., the user labelling the data element as a document). In such an example, the analysis of the data element and/or the selection made by the user of the data user device 62 may cause the data management device 14 to receive an indicator that indicates that the data element is to be broken up.

If it is determined that the encrypted data element should not be broken up, the method 200 may move to step 236, where the entire encrypted data element is transmitted. The entire encrypted data element may refer to all of the encrypted data element (e.g., the encrypted data element may not be broken up into encrypted data portions). For example, if the encrypted data element is "9XL21748AF41", the entire "9XL21748AF41" may be transmitted without being broken up. An example of an entire encrypted data element is illustrated in FIG. 2b as encrypted data element 258. The entire encrypted data element may be transmitted for storage. For example, the entire encrypted data element may be transmitted for storage in data storage device 54 of FIG. 1. The entire encrypted data element may be transmitted for storage in any of the data storage devices 54 of FIG. 1. For example, if system 10 of FIG. 1 includes three data storage devices 54, the entire encrypted data element may be stored in the first data storage device 54, the second data storage device 54, or the third data storage device 54. Furthermore, the data storage device 54 that receives the entire encrypted data element may store the entire encrypted data element without breaking it up.

The entire encrypted data element may be transmitted in any manner. For example, the entire encrypted data element may be transmitted to the data storage device 54 by the data management device 14, such as via one or more of storage transmissions 108. In particular embodiments, as a result of transmitting the entire encrypted data element for storage in the data storage device 54, the data management device 14 may receive (or otherwise know) the location where the entire encrypted data element was stored (e.g., Column 2, Row 18 of the second data storage device 54). An indicator of this location may be stored by the data management device 14 (such as in location database 46 of FIG. 1). As such, when the data management device 14 receives the token for the data element, the data management device 14 may be able to look up where the encrypted data element is stored.

On the other hand, if it is determined that the encrypted data element should be broken up, the method 200 may move to step 228, where the encrypted data element is broken up into encrypted data portions. The encrypted data element may be broken up into any number of encrypted data portions. For example, the encrypted data element may be broken up into two encrypted data portions, three encrypted data portions, four encrypted data portions, ten encrypted data portions, 100 encrypted data portions, 1,000 encrypted data portions, or any other number of encrypted data portions. Furthermore, each encrypted data portion may include any amount (or portion) of the encrypted data element. In particular embodiments, the encrypted data element may be broken up into encrypted data portions based on size. For example, each encrypted data portion may be a portion of the encrypted data element having a particular size, such as 128 megabytes, 256 megabytes, 512 megabytes, 1 gigabyte, or any other size. An example of encrypted data portions of an encrypted data element are illustrated in FIG. 2b as encrypted data portions 262a and 262b. As illustrated, the encrypted data element 258 (e.g., "9XL21748AF41") may be broken up into a first encrypted data portion 262a (e.g., "9XL217") and a second encrypted data portion 262b (e.g., "48AF41").

After the encrypted data element is broken up into encrypted data portions (at step 228), the method 200 may move to step 232, where each encrypted data portion is transmitted. Each encrypted data portion may be transmitted for storage. For example, each encrypted data portion may be transmitted for storage in data storage devices 54 of FIG. 1. In particular embodiments, each encrypted data portion (of an encrypted data element) may be stored in a different data storage device 54 of FIG. 1, in particular embodiments. For example, if system 10 of FIG. 1 includes two data storage devices 54 and an encrypted data element is broken into two encrypted data portions, the first encrypted data portion (of the encrypted data element) may be stored in the first data storage device 54 (e.g., first data storage device 54a of FIG. 2b) and the second encrypted data portion (of the encrypted data element) may be stored in the second data storage device 54 (e.g., second data storage device 54b of FIG. 2b). An example of transmitting the encrypted data portions (of an encrypted data element) into different data storage devices 54 is illustrated in FIG. 2b. Additionally (or alternatively), in particular embodiments, when a data storage device 54 includes two or more databases, encrypted data portions of the same encrypted data element may be stored in different databases of the same data storage device 54. Alternatively (or additionally), when an encrypted data element is broken up into encrypted data portions, each encrypted data portion (of that encrypted data element) may be stored in different unrelated locations of the same data storage device 54, in particular embodiments. For example, if an encrypted data element is broken into three encrypted data portions, the first encrypted data portion may be stored in a first location in the first data storage device 54 (e.g., the location at Column 1, Row 1 of a database), the second encrypted data portion may be stored in a second unrelated location in the first data storage device 54 (e.g., the location at Column 10, Row 15 of the database), and the third encrypted data portion may be stored in a third unrelated location in the first data storage device 54 (e.g., the location at Column 89, Row 115 of the database).

The encrypted data portions (of an encrypted data element) may be transmitted in any manner. For example, the encrypted data portions may be transmitted to the data storage devices 54 by the data management device 14, such as via one or more of storage transmissions 108. In particular embodiments, as a result of transmitting the encrypted data portions (of an encrypted data element) for storage in the data storage devices 54, the data management device 14 may receive (or otherwise know) the location where each encrypted data portion was stored (e.g., the first encrypted data portion may be stored at Column 2, Row 18 of the first data storage device 54 and the second encrypted data portion may be stored at Column 100, Row 29 of the second data storage device 54). In particular embodiments, indicators of the locations of the encrypted data portions may be stored by the data management device 14. For example, an indicator of the location of the first encrypted data portion may be stored in location database 46, and an indicator of the location of the second encrypted data portion may be transmitted for storage with, for example, the first encrypted data element (e.g., at Column 2, Row 18 of the first data storage device 54). As such, when the data management device 14 receives the token for the data element, the data management device 14 may be able to look up where the first encrypted data portion is stored. Furthermore, when the data management device 14 retrieves the first encrypted data portion, it may also retrieve an indicator of the location of the second data portion. Using this indicator, the data management device 14 may retrieve the second encrypted data portion.

Following transmission of the encrypted data portions (at step 232) or following the transmission of the entire encrypted data element (at step 236), the method 200 may move to step 240, where it is determined whether there are any other data elements. If there are more data elements, method 200 may move back to step 208, and steps 208-236 may be repeated for each data element. As such any number of data elements may be stored by data management device 14, and the data elements may be received for storage by any number of data user devices 62. If there are not any more data elements, method 200 may move to step 244, where method 200 ends.

Modifications, additions, or omissions may be made to method 200. For example, although the steps of method 200 are described above as being performed by data management device 14, in particular embodiments, one or more of the steps of method 200 may be performed by any other device. As another example, one or more steps of method 200 may be optional, or may not be performed. In particular embodiments, the step 236 of transmitting the entire encrypted data element may not be performed, as the encrypted data element may always be broken up into encrypted data portions. In particular embodiments, the step 212 of generating a token for the data element and the step 216 of transmitting the token may not be performed. Additionally, the steps of method 200 may be performed in parallel or in any suitable order.

FIG. 3 illustrates an example method of retrieving a requested data element from storage. In particular embodiments, one or more steps of method 300 may be performed by data management device 14 of FIG. 1. Furthermore, one or more steps of method 300 may be (or may be performed in response to) one or more data element requests 112, retrieval requests 116, retrieval transmissions 120, and/or data responses 124 of FIG. 1.

The method 300 begins at step 304. At step 308, a token for a data element is received. As is discussed above, a token may uniquely identify a particular data element stored by the data management device 14. The token may uniquely identify any data element discussed above with regard to FIGS. 1-2. Furthermore, the token may be received for any reason. For example, the token may be received in order to request that the data element uniquely identified by the token be retrieved and transmitted to the requestor (e.g., a business that desires to view or use the data element, such as a social security number). In such an example, a business (for example) may have stored a data element (e.g., a social security number of a customer) by transmitting the data element to the data management device 14. When the business desires to view (or use) the customer's social security number, an employee of the business may transmit the token to the data management device 14 (e.g., by clicking on the token, activating the token, or uploading the token), causing the token to be transmitted to the data management device 14 to request the social security number. The token may be received in any manner. For example, the token may be received from the data user device 62 via one or more data element requests 112.

At step 312, it is determined whether the data element was stored as broken up encrypted data portions. As is discussed above, a data element may be encrypted and then the entire encrypted data element may be transmitted (such as for storage), or the encrypted data element may be broken up into encrypted data portions and each encrypted data portion may be transmitted (such as for storage). Whether the data element was stored as broken up encrypted data portions may be determined in any manner. As an example, information regarding the data element may be stored by the data management device 14 in the location database 46 of FIG. 1. This information may include the token for the data element, an indicator of the location of the encrypted data element (or of one of the encrypted data portion of the encrypted data element), a data key used to encrypt the data element and/or decrypt the encrypted data element, metadata (or other information) associated with the data element, any other information, or any combination of the preceding. The metadata associated with the data element may include, for example, an indicator of whether or not the date element was stored as broken up encrypted data portions. In such an example, the received token may be matched to the token stored in the location database 46, and then the device management device 14 may access the metadata for the matched token to determine whether or not the data element was stored as broken up encrypted data portions.

If it is determined that the data element was not stored as broken up encrypted data portions (e.g., it was stored as an entire encrypted data element), the method 300 may move to step 324, where the entire encrypted data element is retrieved. The entire encrypted data element may be retrieved in any manner. As an example, as is discussed above, the location database 46 may include a token for the data element and an indicator of the location of the encrypted data element. In such an example, the received token may be matched to the token stored in the location database 46, and then the device management device 14 may access the indicator of the location of the encrypted data element. Furthermore, based on the indicator of the location of the encrypted data element, the data management device 14 may retrieve the entire encrypted data element. For example, if the indicator indicates that the encrypted data element is stored in a particular location (e.g., Column 2, Row 15 of the second data storage device 54 of FIG. 1), the data management device 14 may transmit a request to the second data storage device 54 (e.g., via retrieval request 116). In response to the request, the second data storage device 54, for example, may locate the requested encrypted data element and transmit the requested encrypted data element to the device management device 14. As another example, if the indicator indicates that the encrypted data element is stored in a particular location (e.g., Column 2, Row 15 of the second data storage device 54 of FIG. 1), the data management device 14 may directly access the second data storage device 54, locate the encrypted data element (e.g., at Column 2, Row 15), and retrieve the encrypted data element from storage.

On the other hand, if it is determined that the data element was stored as broken up encrypted data portions, the method 300 may move to step 316, where each encrypted data portion is retrieved. The encrypted data portions may be retrieved in any manner. As an example, as is discussed above, the location database 46 may include a token for the data element and an indicator of the location of an encrypted data portion of the data element (such as the first encrypted data portion of the data element). In such an example, the received token may be matched to the token stored in the location database 46, and then the device management device 14 may access the indicator of the location of the first encrypted data portion. Furthermore, based on this indicator of the location of the first encrypted data portion, the data management device 14 may retrieve the first encrypted data portion. Such a retrieval may be performed by requesting the first encrypted data portion from a data storage device 54, or directly accessing and retrieving the first encrypted data portion from the data storage device 54, as is discussed above with regard to step 324. In addition to retrieving the first encrypted data portion, the data management device 14 may also retrieve an indicator of the location of the second encrypted data portion of the encrypted data element (which may be stored with the first encrypted data portion, as is discussed above). Using this retrieved indicator, the data management device 14 may retrieve the second encrypted data portion for the data element. Furthermore, such a method of retrieval may continue until each encrypted data portion of the encrypted data element is retrieved.

Although the location database 46 has been described above including an indicator of the location of the first encrypted data portion of the data element, the location database 46 may include an indicator of the location of any of the encrypted data portions, such as the second encrypted data portion or the last encrypted data portion. Furthermore, although the indicator of the location of the second encrypted data portion has been described above as being stored with the first encrypted data portion, in particular embodiments, the location of the second encrypted data portion (or any other encrypted data portion) may be stored in any other location, such as with the third encrypted data portion (or any other encrypted data portion). In such embodiments, the encrypted data portions may be retrieved in any order (e.g., first encrypted data portion to last encrypted data portion, last encrypted data portion to first encrypted data portion, skipping around between encrypted data portions, etc.). Additionally, although the location database 46 has been described above as including an indicator of the location of only one encrypted data portion of the encrypted data element, in particular embodiments, the location database 46 may include an indicator of the location of any number of the encrypted data portions (such as all of the encrypted data portions, for example). Furthermore, the indicators of the locations of encrypted data elements (or encrypted data portions of encrypted data elements) may be encrypted, such as encrypted using one or more encryption methods 34, or any other method of encryption. In such embodiments, storing and retrieving the indicators may include encrypting and/or decrypting the indicators.

At step 320, the encrypted data element is re-assembled. The encrypted data element may be re-assembled in any manner. As an example, the first encrypted data portion may be combined with the second encrypted data portion (and with any other encrypted data portion of the data element) in order to re-assemble the encrypted data element. In such an example, if the first encrypted data portion is "9XL217", for example, and the second encrypted data portion is "48AF41", for example, the first encrypted data portion may be combined with the second encrypted data portion to re-assemble the encrypted data element into "9XL21748AF41", for example.

After the encrypted data element has been re-assembled (at step 320) or the entire encrypted data element has been retrieved (at step 324), the method 300 may move to step 328, where the encrypted data element is decrypted. The encrypted data element may be decrypted in any manner. In particular embodiments, the encrypted data element may be encrypted in an opposite manner of its encryption. In particular embodiments, the encrypted data element may be decrypted using one or more encryption keys 38, such as one or more data user keys, data keys, master keys, any other key, or any combination of the preceding. As one example, the data management device 14 may retrieve one or more master keys (discussed above), the data user key (discussed above) for the user of the data user device 62 that transmitted the token to the data management device 14 (or for the user of the data user device 62 that transmitted the data element to the data management device 14 for storage), and the data key (discussed above) for the data element. The master keys may be retrieved from, for example, memory 26 of FIG. 1. The data user key may be retrieved from, for example, memory 26 of FIG. 1 when the user of the data user device 62 has been authenticated by the data management device 14 and is communicating with the data management device 14 (such as when the user of the data user device 14 enters a password to log into an account with the data management device 14, and then transmits the received token). The data key may be retrieved from, for example, the location database 46 when the received token is matched to the token in the location database 46. Furthermore, the data user key and the data key may both be decrypted using the one or more master keys (such as by, for example, performing a MD5 one-way hash of the master keys). Additionally, after the data user key and the data key have been decrypted, the data user key and the data key may be used to decrypt the encrypted data element, such as using, for example, one or more encryption methods 34.

After the encrypted data element has been decrypted (at step 328), the method 300 may move to step 332, where the data element is transmitted. The data element may be transmitted to any device, such as, for example, the data user device 62 of FIG. 1. In particular embodiments, the data element may be transmitted to the device (such as data user device 62 of FIG. 1) that transmitted the token to the data management device 14. In further embodiments, the data element may be transmitted to a device (such as a third party device) that was identified by the data user device 62 that transmitted the token to the data management device 14. The data element may be transmitted in any manner. For example, the data element may be transmitted to the data user device 62 by the data management device 14, such as via one or more of data responses 124. As such, a data user device 62 associated with, for example, a business may view (or use) the data element (such as a customer's social security number).

At step 336, it is determined whether there are any other tokens. If there are more tokens, method 300 may move back to step 308, and steps 308-332 may be repeated for each token. As such any number of data elements may be retrieved by data management device 14, and the data elements may be requested by an number of data user devices 62 (or other devices). If there are not any more tokens, method 300 may move to step 340, where the method 300 ends.

Modifications, additions, or omissions may be made to method 300. For example, although the steps of method 300 are described above as being performed by data management device 14, in particular embodiments, one or more of the steps of method 300 may be performed by any other device. As another example, one or more steps of method 300 may be optional, or may not be performed. In particular embodiments, the step 308 of receiving a token may not be performed, as retrieval of a data element may be requested in a different manner. Additionally, the steps of method 300 may be performed in parallel or in any suitable order.

The foregoing description of the various exemplary embodiments is provided to enable any person skilled in the art to make and use the present invention and its embodiments. Various modifications to these embodiments are possible, and the generic principles presented herein may be applied to other embodiments as well.

Some embodiments may be implemented using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. Computers and computer systems described herein may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the embodiments as described hereinabove may be implemented in many different embodiments of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present invention. The instructions may be implemented, for example, using any suitable programming language, which may include high-level, low-level, object-oriented, visual, compiled or interpreted programming languages, such as, but not limited to, C, C++, Java, BASIC, SQL, Perl, Matlab, Pascal, Visual BASIC, assembly language, machine code, and so forth. The embodiments are not limited in this context.

The methods and systems have been illustrated and described herein as comprising several separate functional elements, such as modules or units. Although certain of such modules or units may be described by way of example, it can be appreciated that a greater or lesser number of modules or units may be used and still fall within the scope of the embodiments. Further, although various embodiments may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention. In one example, the all or a portion of the system, its features or functional elements, modules, units, etc. or one or more steps of the method may be associated with, implemented by, executed on, or embedded in (e.g., as embedded software/firmware) one or more hardware components, (e.g., as described above). Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The embodiments are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification, and such amendments comply with the requirements of 35 U.S.C. §§ 112(a) and 132(a).

The invention claimed is:

1. A system, comprising:
one or more memory units configured to store one or more instructions; and
one or more processors coupled to the memory units and configured, upon executing the one or more instructions, to:
receive a single transmission including a plurality of data elements, each of the plurality of data elements in the single transmission being predefined by a user;
for a first data element of the plurality of data elements:
generate a first token for the first data element;
transmit the first token to a device from which the first data element was received;
individually encrypt the first data element;
break the first encrypted data element into a plurality of encrypted data portions of the first encrypted data element, the plurality of encrypted data portions of the first encrypted data element including a first encrypted data portion of the first encrypted data element and a second encrypted data portion of the first encrypted data element;
transmit the first encrypted data portion of the first encrypted data element for storage in a first data storage device;
transmit the second encrypted data portion of the first encrypted data element for storage in a second data storage device;
receive the first token;
based on the received first token, retrieve an indicator of a location of the first encrypted data portion of the first encrypted data element stored in the first data storage device;
based on the indicator of the location of the first encrypted data portion of the first encrypted data element, retrieve the first encrypted data portion of the first encrypted data element from the first data storage device, and further retrieve an indicator of a location of the second encrypted data portion of the first encrypted data element stored in the second data storage device;
based on the indicator of the location of the second encrypted data portion of the first encrypted data element, retrieve the second encrypted data portion of the first encrypted data element from the second data storage device;
re-assemble the first encrypted data element using the first encrypted data portion of the first encrypted data element and the second encrypted data portion of the first encrypted data element;
decrypt the first encrypted data element; and
transmit the first data element to a device from which the first token was received.

2. A system, comprising:
one or more memory units configured to store one or more instructions; and
one or more processors coupled to the memory units and configured, upon executing the one or more instructions, to:
receive a single transmission including a plurality of data elements, each of the plurality of data elements in the single transmission being predefined by a user;
for a first data element of the plurality of data elements:
generate a first token for the first data element;
transmit the first token to a device from which the first data element was received;
individually encrypt the first data element;
break the first encrypted data element into a plurality of encrypted data portions of the first encrypted data element, the plurality of encrypted data portions of the first encrypted data element including a first encrypted data portion of the first encrypted data element and a second encrypted data portion of the first encrypted data element;
transmit the first encrypted data portion of the first encrypted data element for storage in a first data storage device; and
transmit the second encrypted data portion of the first encrypted data element for storage in a second data storage device.

3. The system of claim 2, wherein the one or more processors are further configured, upon executing the one or more instructions, to:
for a second data element of the plurality of data elements:
generate a second token for the second data element;
transmit the second token to a device from which the second data element was received;
individually encrypt the second data element; and
transmit the entire second encrypted data element for storage.

4. The system of claim 3, wherein the one or more processors are further configured, upon executing the one or more instructions, to receive an indication that the second data element is not to be broken up, wherein the entire second encrypted data element is transmitted for storage based on the indication that the second data element is not to be broken up.

5. The system of claim 2, wherein the one or more processors are further configured, upon executing the one or more instructions, to:
for a second data element of the plurality of data elements:
generate a second token for the second data element;
transmit the second token to a device from which the second data element was received;
individually encrypt the second data element;
break the second encrypted data element into a plurality of encrypted data portions of the second encrypted data element, the plurality of encrypted data portions of the second encrypted data element including a first encrypted data portion of the second encrypted data element and a second encrypted data portion of the second encrypted data element;
transmit the first encrypted data portion of the second encrypted data element for storage in the first data storage device; and
transmit the second encrypted data portion of the second encrypted data element for storage in the second data storage device.

6. The system of claim 2, wherein the one or more processors are further configured, upon executing the one or more instructions, to receive an indication that the first data element is to be broken up, wherein the first encrypted data element is broken into a plurality of encrypted data portions of the first encrypted data element based on the indication that the first data element is to be broken up.

7. The system of claim 6, wherein the indication that the first data element is to be broken up comprises an indication that the first data element is a document.

8. The system of claim 2, wherein the single transmission comprises a single application programming interface (API) protocol transmission.

9. A non-transitory computer readable medium comprising logic configured, when executed by one or more processors, to:
   receive a single transmission including a plurality of data elements, each of the plurality of data elements in the single transmission being predefined by a user;
   for a first data element of the plurality of data elements:
      generate a first token for the first data element;
      transmit the first token to a device from which the first data element was received;
      individually encrypt the first data element;
      break the first encrypted data element into a plurality of encrypted data portions of the first encrypted data element, the plurality of encrypted data portions of the first encrypted data element including a first encrypted data portion of the first encrypted data element and a second encrypted data portion of the first encrypted data element;
      transmit the first encrypted data portion of the first encrypted data element for storage in a first data storage device; and
      transmit the second encrypted data portion of the first encrypted data element for storage in a second data storage device.

10. The non-transitory computer readable medium of claim 9, wherein the logic is further configured, when executed by the one or more processors, to:
   for a second data element of the plurality of data elements:
      generate a second token for the second data element;
      transmit the second token to a device from which the second data element was received;
      individually encrypt the second data element; and
      transmit the entire second encrypted data element for storage.

11. The non-transitory computer readable medium of claim 10, wherein the logic is further configured, when executed by the one or more processors, to receive an indication that the second data element is not to be broken up, wherein the entire second encrypted data element is transmitted for storage based on the indication that the second data element is not to be broken up.

12. The non-transitory computer readable medium of claim 9, wherein the logic is further configured, when executed by the one or more processors, to:
   for a second data element of the plurality of data elements:
      generate a second token for the second data element;
      transmit the second token to a device from which the second data element was received;
      individually encrypt the second data element;
      break the second encrypted data element into a plurality of encrypted data portions of the second encrypted data element, the plurality of encrypted data portions of the second encrypted data element including a first encrypted data portion of the second encrypted data element and a second encrypted data portion of the second encrypted data element;
      transmit the first encrypted data portion of the second encrypted data element for storage in the first data storage device; and
      transmit the second encrypted data portion of the second encrypted data element for storage in the second data storage device.

13. The non-transitory computer readable medium of claim 9, wherein the logic is further configured, when executed by the one or more processors, to:
   receive the first token;
   based on the received first token, retrieve an indicator of a location of the first encrypted data portion of the first encrypted data element stored in the first data storage device;
   based on the indicator of the location of the first encrypted data portion of the first encrypted data element, retrieve the first encrypted data portion of the first encrypted data element from the first data storage device, and further retrieve an indicator of a location of the second encrypted data portion of the first encrypted data element stored in the second data storage device;
   based on the indicator of the location of the second encrypted data portion of the first encrypted data element, retrieve the second encrypted data portion of the first encrypted data element from the second data storage device;
   re-assemble the first encrypted data element using the first encrypted data portion of the first encrypted data element and the second encrypted data portion of the first encrypted data element;
   decrypt the first encrypted data element; and
   transmit the first data element to a device from which the first token was received.

14. The non-transitory computer readable medium of claim 9, wherein the logic is further configured, when executed by the one or more processors, to receive an indication that the first data element is to be broken up, wherein the first encrypted data element is broken into a plurality of encrypted data portions of the first encrypted data element based on the indication that the first data element is to be broken up.

15. A method, comprising:
   receiving, by one or more processors, a single transmission including a plurality of data elements, each of the plurality of data elements in the single transmission being predefined by a user;
   for a first data element of the plurality of data elements:
      generating, by the one or more processors, a first token for the first data element;
      transmitting, by the one or more processors, the first token to a device from which the first data element was received;
      individually encrypting, by the one or more processors, the first data element;
      breaking, by the one or more processors, the first encrypted data element into a plurality of encrypted data portions of the first encrypted data element, the plurality of encrypted data portions of the first encrypted data element including a first encrypted data portion of the first encrypted data element and a second encrypted data portion of the first encrypted data element;
      transmitting, by the one or more processors, the first encrypted data portion of the first encrypted data element for storage in a first data storage device; and
      transmitting, by the one or more processors, the second encrypted data portion of the first encrypted data element for storage in a second data storage device.

16. The method of claim 15, further comprising:
for a second data element of the plurality of data elements:
- generating, by the one or more processors, a second token for the second data element;
- transmitting, by the one or more processors, the second token to a device from which the second data element was received;
- individually encrypting, by the one or more processors, the second data element; and
- transmitting, by the one or more processors, the entire second encrypted data element for storage.

17. The method of claim 16, further comprising receiving, by the one or more processors, an indication that the second data element is not to be broken up, wherein the entire second encrypted data element is transmitted for storage based on the indication that the second data element is not to be broken up.

18. The method of claim 15, further comprising:
for a second data element of the plurality of data elements:
- generating, by the one or more processors, a second token for the second data element;
- transmitting, by the one or more processors, the second token to a device from which the second data element was received;
- individually encrypting, by the one or more processors, the second data element;
- breaking, by the one or more processors, the second encrypted data element into a plurality of encrypted data portions of the second encrypted data element, the plurality of encrypted data portions of the second encrypted data element including a first encrypted data portion of the second encrypted data element and a second encrypted data portion of the second encrypted data element;
- transmitting, by the one or more processors, the first encrypted data portion of the second encrypted data element for storage in the first data storage device; and
- transmitting, by the one or more processors, the second encrypted data portion of the second encrypted data element for storage in the second data storage device.

19. The method of claim 15, further comprising:
receiving, by the one or more processors, the first token;
based on the received first token, retrieving, by the one or more processors, an indicator of a location of the first encrypted data portion of the first encrypted data element stored in the first data storage device;
based on the indicator of the location of the first encrypted data portion of the first encrypted data element, retrieving, by the one or more processors, the first encrypted data portion of the first encrypted data element from the first data storage device, and further retrieving, by the one or more processors, an indicator of a location of the second encrypted data portion of the first encrypted data element stored in the second data storage device;
based on the indicator of the location of the second encrypted data portion of the first encrypted data element, retrieving, by the one or more processors, the second encrypted data portion of the first encrypted data element from the second data storage device;
re-assembling, by the one or more processors, the first encrypted data element using the first encrypted data portion of the first encrypted data element and the second encrypted data portion of the first encrypted data element;
decrypting, by the one or more processors, the first encrypted data element; and
transmitting, by the one or more processors, the first data element to a device from which the first token was received.

20. The method of claim 15, further comprising receiving, by the one or more processors, an indication that the first data element is to be broken up, wherein the first encrypted data element is broken into a plurality of encrypted data portions of the first encrypted data element based on the indication that the first data element is to be broken up.

* * * * *